United States Patent Office 3,126,420
Patented Mar. 24, 1964

3,126,420
PREPARATION OF JET FUELS
Herman S. Bloch, Skokie, and William K. T. Gleim, Island Lake, Ill., assignors to Universal Oil Products Company, Des Plaines, Ill., a corporation of Delaware
No Drawing. Filed July 5, 1960, Ser. No. 40,569
2 Claims. (Cl. 260—666)

This invention relates to the preparation of aviation jet fuels by the catalytic polymerization of normally gaseous olefinic hydrocarbons.

The development and widespread acceptance of jet engines for commercial as well as for military aviation purposes has resulted in an increased demand for such hydrocarbon fuels as are suitable for jet engine operation. Further, by reason of the comparatively rapid development of jet engines, fuels which were acceptable in the past have become inadequate. In order to keep pace with and to take advantage of recent and contemplated refinements in jet engines it is necessary to develop improved fuels as well as an economical source thereof. A number of requirements which an acceptable jet fuel must meet will be readily apparent. For example, the fuel must burn with a high heat of combustion to generate the necessary high velocity exhaust gases. Coupled with a high heat of combustion an acceptable fuel should be of a relatively high density as space available for fuel storage aboard jet aircraft is limited. This results in the requirement of a high ratio of energy per pound of fuel as well as per gallon. High energy coupled with high density is a combination difficult to find. Also jet fuels are exposed to high temperatures generated by the ever increasing speeds of jet aircraft. This adds a further requirement that the fuel must be thermally stable at the high temperatures to which it is exposed.

Certain hydrocarbons possess molecular structures related to the properties which are desirable in a jet fuel. For example, paraffins, because of their high hydrogen to carbon ratio, have a high heat of combustion. However, their utility is limited because they lack the required density. Monocyclics exhibit a slightly lower heat of combustion but possess a higher density. Polycyclics on the other hand combine good heat of combustion with the required high density of a jet fuel.

It is an object of this invention to present a process for the catalytic polymerization of normally gaseous olefinic hydrocarbons to produce substantially polycyclic naphthenic hydrocarbons suitable for use as aviation jet fuels.

This invention embodies a process which comprises charging a hydrocarbon stream comprising normally gaseous olefinic hydrocarbons to a reaction zone maintained under polymerizing conditions of temperature and pressure and containing therein a polymerization catalyst, polymerizing said olefinic hydrocarbons therein and withdrawing the resultant polymerization product from said reaction zone, passing the polymerization product to a separator and separating said polymerization product into a heavy polymer boiling in excess of about 500° F. and a lower boiling polymer, recycling at least a portion of the last mentioned polymer to the aforesaid reaction zone, charging the higher boiling heavy polymer and hydrogen to a hydrogenating zone containing therein a hydrogenation catalyst and hydrogenating said heavy polymer therein under hydrogenating conditions of temperature and pressure to produce a jet fuel comprising polycyclic naphthenic hydrocarbons.

In accordance with the process of the present invention a hydrocarbon stream comprising normally gaseous olefinic hydrocarbons is charged to a reaction zone under polymerizing conditions of temperature and pressure, said reaction zone containing therein a polymerization catalyst.

The hydrocarbon charge comprises normally gaseous olefinic hydrocarbons, preferably mono-olefinic hydrocarbons, for example, ethylene, propylene, 1-butane, 2-butene, 1-pentene, 2-pentene, and the like. Propylene is particularly preferred. The propylene is generally diluted with an inert hydrocarbon, such as propane. It is also contemplated that gaseous mixtures comprising olefinic hydrocarbons, such as result from the thermal or catalytic cracking of petroleum stocks, can be utilized although not necessarily with equivalent results.

The hydrocarbon charge comprising gaseous olefinic hydrocarbons is contacted with a polymerization catalyst within a reaction zone maintained under polymerizing conditions of temperature and pressure. The polymerization reaction is exothermic in nature and it is therefore generally preferred to charge the gaseous olefinic hydrocarbon in a diluted state, for example, propylene diluted with an inert hydrocarbon such as propane, in order to maintain proper control over the temperature of reaction. The polymerization temperature can be from about 450° F. to about 650° F.; however, it is preferred to operate in the more restricted range of from about 500° F. to about 600° F., particularly where the olefinic hydrocarbon charge comprises propylene. The reaction is carried out under superatmospheric pressures, at least as much as about 600 p.s.i., and can be as high as about 1200 p.s.i., or more. However, good results are obtained when operating in the preferred range of from about 700 p.s.i. to about 900 p.s.i.

The polymerization catalysts utilized in the present process comprise phosphoric acids prepared in substantially solid form by conventional methods known to those skilled in the art. Of the various acids of phosphorus, orthophosphoric acid ($H_3PO_4$) and pyrophosphoric acid ($H_4P_2O_7$) are generally preferred, chiefly because of their availability and relatively low cost. However, this invention is not limited to the use of the last mentioned acids of phosphorus as other acids of phosphorus can be utilized insofar as they are adaptable—for example, triphosphoric acid ($H_5P_3O_{10}$) and tetraphosphoric acid ($H_6P_4O_{13}$). It is not intended to infer that the different acids of phosphorus are necessarily equivalent as each will exert its own characteristic catalytic effect.

The phosphoric acid is used in conjunction with a substantially unreactive and generally siliceous adsorbent material. Siliceous carrier materials including diatomaceous earth, kieselguhr, and artificially prepared porous silica, as well as certain members of the class of aluminum silicates including naturally occurring clays, such as bentonite, montmorillonite, acid treated clays, and also various fuller's earths are generally utilized for this purpose.

A preferred method of preparation of the solid phosphoric acid catalyst is by commingling the particular phosphoric acid with a powdered form of the siliceous carrier material, the phosphoric acid being heated to facilitate the commingling operation. The resulting composite of phosphoric acid and siliceous carrer material is a moist composite which in most cases must be heated to a paste-like consistency before it becomes dry enough to be formed into shaped particles, preferably by extrusion methods. The extruded particles are then dried at about 340° F. and calcined at a temperature of from about 850° F. to about 1250° F. The calcination treatment is generally carried out for a period of from about 0.25 to about 10 hours to form a substantially solid granular material. It is preferred that the calcined catalyst comprise from about 60 wt. percent to about 80 wt. percent phosphoric acid.

The polymerization product withdrawn from the reaction zone is separated into a heavy polymer and a light polymer, said light polymer comprising that portion of the polymerization product which boils below about 500° F. This light polymer generally comprises olefinic hydrocarbons containing less than about 15 carbon atoms per molecule. When the charge stock is propylene this light polymer comprises dimers, trimers, tetramers, and pentamers of propylene. The products recovered as light polymers are useful in themselves as motor fuels, or for chemical intermediates, for example, in the preparation of detergents, etc. It may be preferred in some instances to recycle at least a portion of the light polymer to increase the yield of the heavy polymer with which the present invention is primarily concerned.

The heavy polymer has reference to that portion of the polymerization product boiling in excess of about 500° F. and generally comprises olefinic hydrocarbons containing about 15 or more carbon atoms per molecule. While the light polymer portion of the polymerization product is substantially aliphatic in character, the heavy polymer portion has quite unexpectedly been found to be polycyclic naphthenic in character.

In accordance with the further process of this invention said heavy polymer is catalytically hydrogenated to yield a stable, high density, high heat content fuel of excellent jet-burning characteristics.

Hydrogenation of the heavy polymer portion of the polymerization product can be readily accomplished by conventional methods, utilizing conventional hydrogenation catalysts. Hydrogenation is generally effected at superatmospheric pressures and elevated temperatures. Temperatures in the range of from about 125° F. to about 700° F. are suitable, and the pressure can vary from about 100 p.s.i. to about 5000 p.s.i. to give substantially complete hydrogenation of the heavy polymer. It is contemplated that any catalyst or catalyst mixture which has been found to be suitable for utilization in processes involving substantially only hydrogenation reactions is operable in the present process. In the absence of sulfur, arsenic, or other contaminating elements, reduced nickel is a very effective hydrogenation catalyst. Also the platinum group metals comprising platinum, iridium, and osmium are active in this respect to and can be employed where cost and availability permit. The oxides and the sulfides of the metals of groups VIB, i.e., chromium, tungsten, and molybdenum, as well as the corresponding compounds of the iron group metals, i.e., iron, nickel and cobalt are effective hydrogenation catalysts capable of functioning in the presence of contaminating elements such as sulfur, arsenic, etc. A preferred hydrogenation catalyst for this process comprises nickel oxide on a carrier material such as kieselguhr.

The process of this invention may be accomplished in a continuous manner by methods and equipment generally utilized for the continuous polymerization of normally gaseous olefinic hydrocarbons to yield liquid hydrocarbon products. Generally the equipment will include a suitable polymerization reactor which can be a stainless steel tubular reactor designed to operate at superatmospheric pressures and elevated temperatures, a hydrogenation reactor similarly designed, and a fractionator to separate the light polymer from the heavy polymer.

The gaseous hydrocarbon charge may be compressed to a given pressure and preheated prior to passage through the catalyst bed located within the polymerization reactor. The charge may be passed through the catalyst bed in an upflow or in a downflow direction, the latter being preferred in that the charge does not thereby tend to accumulate on the catalyst surface. The polymerization product from the polymerization reactor is charged to the aforementioned fractionating column wherein said polymerization product is separated into a $C_{15}+$ polymer and a lighter polymer. The light polymer can be recovered as is, however, it is desirable to recycle at least a portion thereof to the polymerization reactor to effect increased yields of the heavy polymer. The heavy polymer, and hydrogen, are thereafter charged to the hydrogenation reactor wherein the heavy polymer is hydrogenated to form substantially polycyclic naphthenic hydrocarbons.

The solid phosphoric acid catalyst may function with reduced effectiveness as a result of the excessive dehydration thereof during the course of the polymerization reaction. In this event the catalyst may be contacted, continuously or intermittently, with controlled amounts of super heated steam to produce a catalytic acid of optimum composition.

The following example is presented to indicate the desirable aspects of the product obtainable by the use of the present process. It is not intended to limit the generally broad scope of this invention to the specific examples set forth.

*Example I*

A hydrocarbon mixture comprising about 50 wt. percent propylene and about 50 wt. percent propane was passed through a bed of solid catalytic material comprising about 72 wt. percent pyrophosphoric acid and about 28 wt. percent kieselguhr. The reactor temperature was maintained at about 550° F. and the pressure was regulated at approximately 800 p.s.i. The polymerization product was fractionated and the heavy polymer boiling in excess of about 500° F. was recovered. The heavy polymer was thereafter hydrogenated at a temperature of about 150° F. and a pressure of about 1500 p.s.i. using a nickel-kieselguhr catalyst. The hydrogenated heavy polymer had the following desirable characteristics, indicating that it was of excellent jet fuel quality:

| | |
|---|---|
| Molecular wt. | 302. |
| Specific gravity $_{60}{}^{60}$ | 0.8443. |
| Formula | $C_mH_{2m-0.8}$ (1.4 rings/mol). |
| Kinematic viscosity (100° F.) | 17 cst. |
| Percent $H_2$ | 14.11. |
| Calorific value (calc.): | |
| B.t.u./lb. | 20,000. |
| B.t.u./gal. | 141,000. |

We claim as our invention:

1. A process for producing jet fuel which comprises catalytically polymerizing a normally gaseous olefinic hydrocarbon in the presence of solid phosphoric acid catalyst at a temperature of from about 450° F. to about 650° F. and a pressure of from about 600 to about 1200 p.s.i., thereby forming polycyclic naphthenes of at least 15 carbon atoms per molecule, separating the resultant polymerization product into a light aliphatic polymer boiling below about 500° F. and a heavy polymer boiling above about 500° F. and containing said polycyclic naphthenes, and catalytically hydrogenating said heavy polymer to form a stable, high density, high heat content fuel.

2. The process of claim 1 further characterized in that said olefinic hydrocarbon is propylene.

References Cited in the file of this patent

UNITED STATES PATENTS

| | | |
|---|---|---|
| 2,422,991 | Strang | June 24, 1947 |
| 2,516,699 | Hemminger | July 25, 1950 |
| 2,706,211 | Clark | Apr. 12, 1955 |
| 2,814,655 | Langlois et al. | Nov. 26, 1957 |
| 2,956,002 | Folkins | Oct. 11, 1960 |
| 3,000,981 | Favis | Sept. 19, 1961 |
| 3,002,829 | Kolfenbach et al. | Oct. 3, 1961 |
| 3,004,384 | Saunders | Oct. 17, 1961 |